United States Patent [19]
Kirkman

[11] Patent Number: 5,264,109
[45] Date of Patent: Nov. 23, 1993

[54] ZIRCONIUM AND ZIRCONIUM ALLOY PASSIVATION PROCESS

[75] Inventor: Michael J. Kirkman, Kennewick, Wash.

[73] Assignee: Siemens Power Corporation, Richland, Wash.

[21] Appl. No.: 760,800

[22] Filed: Sep. 16, 1991

[51] Int. Cl.⁵ .................................................. C25D 11/34
[52] U.S. Cl. .................................... 205/212; 205/322
[58] Field of Search ...................... 204/32.1, 56.1; 205/212, 322

[56] References Cited

U.S. PATENT DOCUMENTS

| | | | |
|---|---|---|---|
| 1,787,672 | 1/1931 | Davenport | 204/1.5 |
| 2,711,389 | 6/1955 | Beach et al. | 204/32 |
| 2,938,841 | 5/1960 | Dale | 204/32 |
| 3,063,917 | 11/1962 | Barto | 205/212 |
| 3,159,556 | 12/1964 | McLean et al. | 204/32 |
| 3,259,558 | 7/1966 | Hagiwara et al. | 204/38 |
| 3,502,549 | 3/1970 | Charveriat | 204/37 |
| 3,556,870 | 1/1971 | Debray et al. | 148/6.3 |
| 3,864,220 | 7/1975 | Denning et al. | 204/37 R |
| 3,909,370 | 9/1975 | Videm et al. | 204/32 R |
| 4,017,368 | 4/1977 | Wax et al. | 204/32 R |
| 4,137,131 | 4/1979 | Donaghy | 204/32 R |
| 4,214,952 | 7/1980 | Sato et al. | 205/148 |
| 4,589,929 | 5/1986 | Steinberg | 148/6.3 |
| 4,755,265 | 7/1988 | Young | 204/45.1 |
| 4,857,803 | 8/1989 | Anderson, Sr. | 313/509 |

*Primary Examiner*—John Niebling
*Assistant Examiner*—William T. Leader
*Attorney, Agent, or Firm*—Ira Lee Zebrak

[57] ABSTRACT

A zirconium or zirconium alloy passivation process comprises providing an electrolyte which is capable of removing nickel, nickel alloys and alloys containing nickel from the surface of a zirconium or zirconium alloy article, keeping the dissolved metal in solution while simultaneously anodizing the article surfaces. Such nickel, if not removed provides a window for hydride accumulation to occur, detrimentally affecting the alloy properties when subject to a nuclear reactor environment. An article placed in the electrolyte in proximity to a cathode and connected to a power source has the trace nickel, nickel alloys and alloys containing nickel removed to background levels and reduces the potential for hydride accumulation within the article in a nuclear reactor environment, and provides for increased article life.

8 Claims, 1 Drawing Sheet

ZIRCONIUM AND ZIRCONIUM ALLOY PASSIVATION PROCESS

TECHNICAL FIELD

This invention relates to zirconium and zirconium alloys for use in nuclear reactor assemblies and more particularly to methods for increasing the hydride resistance of the zirconium and zirconium alloys.

BACKGROUND

Zirconium and zirconium alloys have structural and other characteristics which make them desirable for use in nuclear reactor assemblies. For example, such materials have a low neutron cross section, good mechanical properties at elevated temperatures and relatively low co-efficients of thermal expansion. However, such alloys do have several drawbacks, such as the susceptibility to hydriding in an aqueous environment at elevated temperatures. For example, amounts of hydrogen as low as about 70 ppm in zirconium can produce an embrittlement effect, which with time, reduces the strength and integrity of the zirconium component.

In U.S. Pat. No. 3,864,220, zirconium alloy objects are anodized in an aqueous solution containing preferably 1% phosphoric acid. After anodizing, the object is heat treated in an oxygen containing atmosphere to produce an oxidized film, for example, by heat treating for 16 hours at 370° C. in air.

In U.S. Pat. No. 3,909,370, a process for surface treatment of zirconium alloys is disclosed which includes pickling in a fluoride bath and then adding a protective coating by oxidation. An anodizing step eliminates any fluoride contaminants from the surface before autoclaving in water to add the oxide film.

When a zirconium alloy is subjected to high temperature water or steam, the zirconium reacts with the water to form zirconium oxide and liberated hydrogen. Some of this hydrogen enters the zirconium alloy slowly, but diffuses rapidly through the alloy. Small quantities of hydrogen can dissolve in the alloy without reacting with it and some reacts to form zirconium hydride. This hydride is typically uniformly distributed through the zirconium alloy and, within limits, has no detrimental effect.

Nickel, nickel alloys, and/or other metal alloys containing nickel may be deposited on zirconium and zirconium alloy surfaces during part fabrication and finishing processes, or during nuclear fuel manufacturing operations. Most fuel component manufacturing operations utilize stainless steel, an iron alloy containing nickel, whenever possible because of stainless steel's corrosion resistance. Fuel components made of zirconium and zirconium alloys may be pushed or pulled across stainless steel equipment and have small quantities of stainless steel deposited or imbedded in their surfaces. Nickel alloy transfer by this mechanism results in small non-uniform deposits on the zirconium and zirconium alloy surfaces.

Nickel, nickel alloys, and alloys containing nickel can also become imbedded on a zirconium or zirconium alloy surface indirectly through grit blasting operations which are common finishing steps in the nuclear component fabrication industry. For example, by using alloys containing nickel pipe or tubing to conduct the blasting grit and fluid to the work piece, abrasive grit traveling through the alloy tube can impact the alloy tube and pick up small quantities of the alloy on the grit surface. When the grit exits the tube and contacts a zirconium and zirconium alloy part, the alloy on the grit surface can be imbedded into the part surface. Very small quantities of alloy can be uniformly deposited on the part surface by this material transfer mechanism.

While uniform hydriding is acceptable, it has been found that the presence of nickel, nickel alloys, or alloys containing nickel on or near the surface of a zirconium article can provide a window through which hydrogen easily enters the zirconium alloy at a much higher rate than it enters the zirconium surfaces without such a window. When the absorption of hydrogen into the zirconium alloy is rapid, zirconium hydride may form and collect near the surface where the hydrogen enters and form a thick zirconium hydride deposit or "rim" inside the metal near the surface. The zirconium hydride is brittle and occupies a higher volume than a zirconium oxide and can change the physical properties of the part as a whole, making it more prone to failure. A flexible and ductile piece of zirconium alloy tubing thus becomes a brittle and inflexible piece of zirconium hydride at lower temperatures than for the alloy.

SUMMARY OF THE INVENTION

It is an object of the present invention to provide a method for treating zirconium and zirconium alloys to reduce hydride rim formation.

It is a further object to provide a process which eliminates nickel and nickel alloys from the surface of a zirconium or zirconium alloy article to minimize detrimental hydriding in an aqueous environment.

It is a further object to increase the hydride resistance of a zirconium or zirconium alloy article in one step.

These and other objects of the present invention are achieved by providing a zirconium or zirconium alloy article, placing the article in an electrolyte bath, the bath comprising an electrolyte which is capable of dissolving nickel and nickel alloys and maintaining them in solution and simultaneously anodizing the zirconium surfaces to increase hydride resistance of the article, and, anodizing the zirconium or zirconium alloy article.

BRIEF DESCRIPTIONS OF THE DRAWINGS

FIG. 1 is a illustrative view of an electrolytic cell for anodizing a zirconium or zirconium alloy article.

DETAILED DESCRIPTION OF THE INVENTION

Figure 1:
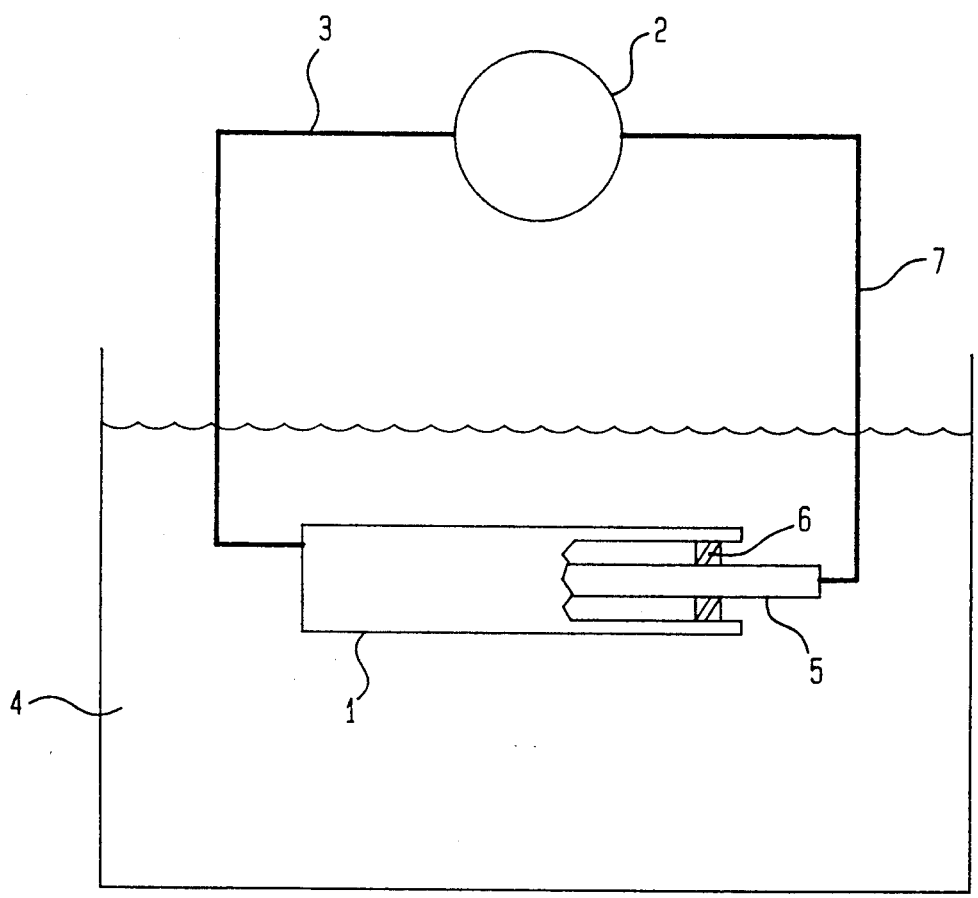

Referring to FIG. 1, a tube 1 is composed of a zirconium or a zirconium alloy such as Zircaloy-2 or -4. For purposes of this application, the terms "zirconium" and "zirconium alloy" are used interchangeably and without limitation to refer to articles having zirconium as a major constituent. For exemplary purposes, the article is a tube, which may be used as a control rod guide tube or an instrument tube in a nuclear reactor assembly. Of course, any zirconium article could also be treated according to the invention.

The tube 1 is connected to a power supply 2 by a wire 3 and acts as an anode. The tube is located in an electrolyte 4. A cathode 5 is located within the tube and is separated from the tube by an insulator 6. The cathode 5 is connected by a wire 7 to the power supply 2 to complete the circuit for forming an electrolytic cell.

By applying potential across the cell, anodizing of the exposed article surfaces takes place. However, by the proper choice of electrolyte, simultaneously, excess nickel, nickel alloys, and alloys containing nickel are removed from the article surfaces to allow the underlying zirconium and zirconium alloys to be completely anodized to limit rapid hydriding during use. The term "nickel", "nickel alloy", and "alloys containing nickel" are used interchangeably throughout the specification, and encompass pure nickel, nickel compounds such as nickel oxides and alloys having nickel as a constituent, particularly stainless steel.

The combined anodizing and nickel removal steps are hereafter termed "passivation" which produces a zirconium oxide film, of about 500 Angstroms in thickness, on the article surface while electrochemically etching the nickel from the surface.

The electrolyte preferably comprises an oxalic acid solution, more preferably a mixture of oxalic acid and nitric acid, though other materials may be used. For example, other organic acids such as citric acid or acetic acid can be substituted for the oxalic acid. Oxalic acid is preferred as the main electrolyte component as, not only does it assist in removing nickel while anodizing zirconium, but it also is a good chelating agent that will hold the dissolved metal ions in solution until removed during rinsing. Being an organic acid, any residual acid left after rinsing would be destroyed quickly by radiolysis. Similarly other inorganic acids such as phosphoric acid or sulfuric acid can be substituted for the nitric acid. While oxalic acid can be used alone, a blend is preferred to assure consistent oxidizing and etching at shorter exposure times.

Typically, a direct current potential greater than approximately 1.6 volts applied across a Zircaloy anode in a electrochemical cell using an appropriate electrolyte causes zirconium alloy oxidation with the oxide film thickness produced being a function of the applied voltage and typically equals about 20 Angstroms per volt. A direct current potential greater than approximately 0.75 volts applied across a nickel alloy (stainless steel) anode in an electrochemical cell using an appropriate electrolyte will cause the stainless steel to dissolve. Zircaloy located near a nickel or nickel alloy rich area will not anodize until the nickel is dissolved at which point the zirconium alloy will then anodize.

The anodizing process itself provides a means for process monitoring, as the current in the electrochemical cell is very high at the start of the reaction. As the nickel is removed and the zirconium alloy begins to anodize, the cell current decreases as the resistance across the developing oxide film increases. Consequently, the anodizing reaction is self limiting and when the current decreases to a predetermined level, the process is complete and the part is removed from the bath.

Typically, the process is run until the cell current decreases to a residual current level established at about 1–5 amps at 24 volts. However, to assure completion of the reaction, it is recommended that the process be continued for several minutes after the current decreases to the residual value.

COMPARATIVE EXAMPLE 1

A small electrochemical cell was constructed using a Zircaloy −4 tube known to contain trace quantities of stainless steel (iron alloy containing nickel) as the anode. A copper tube was inserted into the Zircaloy tube to act as the cathode. The cathode was covered with small pieces of rubber tubing to act as insulators. A 600 milliliter beaker was the cell vessel and the electrolyte was 0.10% by weight sodium hydroxide.

A 24 volt DC potential was applied across the electrochemical cell. A small initial current was observed. After a few seconds, bubbling inside the Zircaloy stopped and the Zircaloy began turning blue, indicating that anodizing was taking place. The anodized tube was rinsed, dried, and had a piece cut for analysis. An analysis for iron was performed, as the presence of iron indicates the presence of stainless steel on the tube, with iron analyzed using a scanning electron microscope (SEM). Iron content on the tube inner surface was reduced from 0.5% to 0.19%, which is the background value for iron in the Zircaloy (0.18% to 0.24%).

As shown in Table I, additional testing showed that stainless steel was not reproducibly removed in sodium hydroxide. Test samples were placed in an autoclave at autoclave conditions chosen to simulate a reactor environment i.e. exposure at 270° C., for 16 hours, at 500 psi hydrogen over pressure in an aqueous solution chemical content equaling 2.2 ppm lithium. Hydride rims formed in the test pieces during the autoclave test.

TABLE I

| SAMPLE | HYDRIDING IRON LEVEL % | UNIFORM | RIMS | |
|---|---|---|---|---|
| 180 Minute Processing Time | | | | |
| Top | 0.39% | Yes | Yes | 85μ |
| Bottom | 1.01% | Yes | Yes | 50μ |

COMPARATIVE EXAMPLE II

Conditions similar to those used in Comparative Example 1 were followed except a stainless steel cathode was used, 0.1% nitric acid was used as the electrolyte, and the tube was a full size guide tube known to contain trace amounts of stainless steel on the tube inner surface. The initial current was approximately 70 amps, at 24 volts, and decreased rapidly to about 48 amps then increased again to 58 amps, then decreased slowly to 17 amps. The current did not decrease further. The test was stopped after 30 minutes and samples taken for evaluation. Iron was not analyzed as hydride rim formation appeared to be the harsher test. The results, shown in Table II, show hydride rims did form.

TABLE II

| SAMPLE | HYDRIDING IRON LEVEL % | UNIFORM | RIMS | |
|---|---|---|---|---|
| Thirty minute Processing Time | | | | |
| Top | Not determined | Yes | No | |
| Mid-1 | " | Yes | Yes | 50μ |
| Mid-2 | " | Yes | Yes | 55μ |
| Bottom | " | Yes | Yes | 45μ |

COMPARATIVE EXAMPLE III

The same procedure as Comparative Example II was followed except 0.5% oxalic acid alone was used as the electrolyte. Initial current was approximately 35 amps at 6 volts which decreased quickly. As the voltage was increased, in 6 volt steps up to 24 volts, the current increased then decreased rapidly. The test was stopped after 5 minutes at a current of about 5 amps and samples taken for evaluation. As shown in Table III, Iron was removed to background levels which indicate that most of the nickel alloy was removed, yet hydride rims did form.

TABLE III

| SAMPLE | Hydriding IRON LEVEL % | UNIFORM | RIMS | |
|---|---|---|---|---|
| Zero minute Processing Time | | | | |
| 1 Top | 0.78 | Yes | Yes | 30μ |
| 2 Bottom | 0.85 | Yes | Yes | 40μ |
| Five minute Processing Time | | | | |
| 1 Top | 0.23 | Yes | No | |
| 2 Bottom | 0.26 | Yes | No | |
| 3 Mid Point | 0.23 | Yes | Hint | |
| 4 Mid Point | 0.23 | Yes | Yes | 0–23μ |

EXAMPLE IV

The same procedure as used in comparative Example III was followed except for a longer processing time, 10 minutes. As shown in Table IV, the longer processing time in oxalic acid produces acceptable autoclave test hydriding results.

TABLE IV

| SAMPLE | HYDRIDING IRON LEVEL % | UNIFORM | RIMS |
|---|---|---|---|
| Ten Minute Processing Time | | | |
| 1 | Not Determined | Yes | No |
| 2 | " | Yes | No |
| 3 | " | Yes | No |
| 4 | | Yes | No |

EXAMPLE V

The same procedure as comparative Example III was followed except an electrolyte of 0.5% oxalic acid and 0.1% nitric acid was used. The potential was initially at 6 volts and increased in one-minute intervals to 12 and then 24 volts. Samples were taken after 10 minutes and then after 20 minutes. As shown in Table V, the mixed electrolyte removed iron to indicate that the nickel alloy was removed and prevented hydride rim formation during the autoclave test.

TABLE V

| SAMPLE | HYDRIDING IRON LEVEL % | UNIFORM | RIMS |
|---|---|---|---|
| Zero Minute Processing Time | | | |
| Top | 0.79 | Yes | Yes |
| Bottom | 0.65 | Yes | Yes |
| Ten Minute Processing Time | | | |
| Top | 0.22 | Yes | No |
| Bottom | 0.16 | Yes | No |
| Twenty Minute Processing Time | | | |
| Top | 0.16 | Yes | No |
| Bottom | 0.16 | Yes | No |

EXAMPLE VI

In view of the success with the 0.5% oxalic acid electrolyte and mixed 0.5% oxalic acid/0.1% nitric acid, additional testing was done to establish the parameters of the process.

In separate tests, five samples were randomly taken through a tube length before testing to determine the base iron, and therefore the base stainless steel level. The test was started at 6 volts, increased to 12 volts after one minute and to 24 volts, 1 minute later. After 5 minutes, two tube samples were taken; the test then resumed for three more minutes, stopped and two additional samples taken. The test then resumed and stopped again at ten minutes total processing time and 8 samples taken. The test resumed and stopped at fifteen minutes with 4 samples taken.

The samples were cut in half and half the samples were tested for iron, the other half autoclaved to determine hydride formation. The results are shown in Table VI for 0.5% oxalic acid and in Table VII for 0.5% oxalic acid/0.1% nitric acid.

TABLE VI

| SAMPLE | HYDRIDING IRON LEVEL % | UNIFORM | RIMS |
|---|---|---|---|
| Zero Minute Processing Time | | | |
| 1 | 0.70 | — | Yes |
| 2 | 0.80 | — | Yes |
| 3 | 0.67 | — | Yes |
| 4 | 0.57 | — | Yes |
| 5 | 0.45 | — | Yes |
| Five Minute Processing Time | | | |
| 1 | 0.19 | — | No |
| 2 | 0.10 | — | No |
| Eight Minute Processing Time | | | |
| 1 | 0.17 | — | No |
| 2 | 0.22 | — | No |
| Ten Minute Processing Time | | | |
| 1 | 0.19 | — | No |
| 2 | — | — | No |
| 3 | — | — | No |
| 4 | — | — | No |
| 5 | — | — | No |
| 6 | — | — | No |
| 7 | — | — | No |
| 8 | 0.15 | — | No |
| Fifteen Minute Processing Time | | | |
| 1 | 0.17 | — | No |
| 2 | — | — | No |
| 3 | — | — | No |
| 4 | 0.17 | — | No |

TABLE VII

| SAMPLE | HYDRIDING IRON LEVEL % | UNIFORM | RIMS |
|---|---|---|---|
| Zero Minute Processing Time | | | |
| 1 | 0.63 | — | Yes |
| 2 | 0.59 | — | Yes |
| 3 | 0.74 | — | Yes |
| 4 | 0.70 | — | Yes |
| 5 | 0.63 | — | Yes |
| Five Minute Processing Time | | | |
| 1 | 0.18 | — | No |
| 2 | 0.21 | — | No |
| Eight Minute Processing Time | | | |
| 1 | 0.18 | — | No |
| 2 | 0.17 | — | No |
| Ten Minute Processing Time | | | |
| 1 | 0.18 | — | No |
| 2 | — | — | No |
| 3 | — | — | No |

TABLE VII-continued

| SAMPLE | HYDRIDING IRON LEVEL % | UNIFORM | RIMS |
|---|---|---|---|
| 4 | — | — | No |
| 5 | — | — | No |
| 6 | — | — | No |
| 7 | — | — | No |
| 8 | 0.15 | — | No |
| Fifteen Minute Processing Time | | | |
| 1 | 0.18 | — | No |
| 2 | — | — | No |
| 3 | — | — | No |
| 4 | 0.22 | — | No |

The amount of oxalic acid, whether alone or in the mixture may be in the range of about 0.25–0.75%. The amount of nitric acid in the mixture may vary from about 0.05%–0.15%, though the 0.5% oxalic/0.1% nitric mixture is preferred.

Optionally, a wetting agent is added to the electrolyte to increase effectiveness. Various wetting agents are known in the art for use in metal surface treatment operations such as etching or pickling. For example, 0.75% PLURONIC L-43 wetting agent, made by BASF Corporation, which is a polyoxypropylene-polyoxyethylene condensate, was added to a mixed acid electrolyte and it was found that current decreased quicker and to a lower level evidencing enhanced reactivity through improved surface contact. Of course, other wetting agents could also be used.

With time and use, the electrolyte may lose its effectiveness. Testing confirmed that even at 50% of initial strength, the electrolyte was still effective at removing nickel and nickel alloys. However, it is recommended that a more conservative approach be used and the electrolyte be changed when the concentration reaches 75% of the initial concentration.

Utilizing the inventive method, a zirconium alloy article is produced which is resistive to hydride accumulation, yet allows normal uniform hydriding to occur. Such an article thus maintains its mechanical properties for extended periods in a nuclear reactor environment.

While preferred embodiments of the present invention are shown and described, it will be understood by those skilled in the art that various changes and modifications could be made without varying from the scope of the invention.

I claim:

1. A method for passivating a nickel containing zirconium or zirconium alloy article comprising:
   providing an electrolyte for dissolving and maintaining nickel in solution and for anodizing the article wherein the electrolyte is an aqueous solution containing an admixture of oxalic acid and nitric acid;
   placing the article in the electrolyte;
   attaching the article to a power source such that the article is an anode;
   placing an electrode in the electrolyte to act as a cathode; and
   passing electrical power through the article for a time sufficient to remove nickel form the surface of the article and to anodize the article surfaces from which the nickel was removed to prevent hydride accumulation.

2. The method of claim 1 wherein the electrolyte is an aqueous solution containing about 0.5% oxalic acid and about 0.1% nitric acid.

3. The method of claim 1 wherein the electrolyte is an aqueous solution containing about 0.05–0.15% nitric acid.

4. The method of claim 1 further comprising adding a wetting agent to the electrolyte.

5. The method of claim 4 wherein the wetting agent is a polyoxypropylene-polyoxyethylene condensate.

6. The method of claim 1 wherein the electrode is made of a material from the group consisting of copper, stainless steel, zirconium or a zirconium alloy.

7. The method of claim 1 wherein the article is treated for about 1–60 minutes.

8. The method of claim 1 wherein the article is treated at from about 6–24 volts.

* * * * *